US012777281B2

(12) United States Patent
Cosnefroy et al.

(10) Patent No.: US 12,777,281 B2
(45) Date of Patent: Oct. 27, 2026

(54) SYSTEMS AND METHODS FOR GENERATING DEVICE-RELATED TRANSFER FUNCTIONS AND DEVICE-SPECIFIC ROOM IMPULSE RESPONSES

(71) Applicant: Treble Technologies, Reykjavik (IS)

(72) Inventors: Matthias Cosnefroy, Reykjavik (IS); Steinar Guðjónsson, Reykjavik (IS); Erin Driscoll, Reykjavik (IS); Sölvi Prastarson, Reykjavik (IS); Jóhannes Einarsson, Reykjavik (IS); Finnur Pind, Reykjavik (IS); Jesper Pedersen, Reykjavik (IS)

(73) Assignee: TREBLE TECHNOLOGIES, Reykjavik (IS)

( * ) Notice: Subject to any disclaimer, the term of this patent is extended or adjusted under 35 U.S.C. 154(b) by 149 days.

(21) Appl. No.: 18/798,167

(22) Filed: Aug. 8, 2024

(65) Prior Publication Data

US 2025/0080908 A1 Mar. 6, 2025

Related U.S. Application Data

(63) Continuation of application No. 18/420,453, filed on Jan. 23, 2024, now Pat. No. 12,063,491.

(30) Foreign Application Priority Data

Sep. 5, 2023 (EP) .................................... 23195400
Oct. 17, 2023 (EP) .................................... 23204159

(51) Int. Cl.
*H04R 3/04* (2006.01)
*H04S 7/00* (2006.01)

(52) U.S. Cl.
CPC ............... *H04R 3/04* (2013.01); *H04S 7/305* (2013.01)

(58) Field of Classification Search
CPC .. H04S 7/301–306; H04S 1/002; H04S 3/002; H04R 3/04
(Continued)

(56) References Cited

U.S. PATENT DOCUMENTS 6,826,483 B1 11/2004 Anderson et al.
9,383,464 B2 7/2016 Shin
(Continued)

FOREIGN PATENT DOCUMENTS

WO 2022167720 A1 8/2022

OTHER PUBLICATIONS

Ahrens, J. et al., "Computation of Spherical Harmonics Based Sound Source Directivity Models from Sparse Measurement Data", e-Forum Acusticum, Dec. 7-11, 2020, Lyon, France, pp. 2019-2026, Open Science.

(Continued)

*Primary Examiner* — Xu Mei
(74) *Attorney, Agent, or Firm* — COATS & BENNETT, PLLC

(57) ABSTRACT

A computer-implemented method for generating a device-specific room impulse response (DSRIR) describing an acoustic characteristic of a device and a room as received by the device includes: generating an at least first device-related transfer function (DRTF), wherein the at least first device related transfer function describes the acoustic characteristic of the device as received by the at least first microphone; generating a spatial room impulse response (SRIR), wherein the spatial room impulse response describes the acoustic characteristic of the room from at least one room sound source in the room and received at an at least one listening (Continued)

point in the room from at least one direction; and generating the device specific room impulse response (DSRIR) by combining the device related transfer function and the spatial room impulse response.

20 Claims, 2 Drawing Sheets

(58) Field of Classification Search
USPC ............... 381/1, 17–20, 59, 96, 63, 309–311
See application file for complete search history.

(56) References Cited

U.S. PATENT DOCUMENTS

| | | | |
|---|---|---|---|
| 9,560,467 B2 | 1/2017 | Gorzel et al. | |
| 9,711,126 B2 | 7/2017 | Mehra et al. | |
| 10,440,498 B1 | 10/2019 | Gari et al. | |
| 10,559,295 B1 | 2/2020 | Abel | |
| 10,777,214 B1 | 9/2020 | Shi et al. | |
| 10,897,570 B1 | 1/2021 | Robinson et al. | |
| 10,986,444 B2 | 4/2021 | Mansour et al. | |
| 11,830,471 B1 | 11/2023 | Mansour et al. | |
| 12,035,123 B2 * | 7/2024 | Schembri | H04S 7/303 |
| 2011/0015924 A1 | 1/2011 | Gunel Hacihabiboglu et al. | |
| 2015/0110310 A1 | 4/2015 | Minnaar | |
| 2020/0196053 A1 * | 6/2020 | Mansour | H04R 1/406 |
| 2020/0214559 A1 | 7/2020 | Krueger et al. | |
| 2020/0395028 A1 | 12/2020 | Kameoka et al. | |
| 2021/0074282 A1 | 3/2021 | Borgstrom et al. | |
| 2021/0074308 A1 | 3/2021 | Skordilis et al. | |
| 2021/0136510 A1 | 5/2021 | Tang et al. | |
| 2022/0051479 A1 | 2/2022 | Agarwal et al. | |
| 2022/0079499 A1 | 3/2022 | Doron et al. | |
| 2022/0101126 A1 | 3/2022 | Bharitkar | |
| 2022/0327316 A1 | 10/2022 | Grauman et al. | |
| 2022/0405602 A1 | 12/2022 | Yoo et al. | |
| 2023/0164509 A1 | 5/2023 | Sporer | |
| 2023/0197043 A1 | 6/2023 | Martinez Ramirez et al. | |
| 2023/0224668 A1 * | 7/2023 | Jang | G10K 15/08 381/17 |
| 2023/0362572 A1 | 11/2023 | Jang et al. | |

OTHER PUBLICATIONS

Pind, F. et al., "A novel wave-based virtual acoustics and spatial audio framework", Audio Engineering Society Conference Paper, AVAR Conference, Richmond, VA, Aug. 15-17, 2022, pp. 1-10, AES.
Sakamoto, S. et al., "Directional sound source modeling by using spherical harmonic functions for finite-difference time-domain analysis", Proceedings of Meetings on Acoustics, vol. 19, 2013, ICA 2013 Montreal, Jun. 2-7, 2013, pp. 1-9, Acoustical Society of America.
Yeh C-Y. et al., "Wave-ray coupling for interactive sound propagation in large complex scenes", ACM Transactions on Graphics, ACM, NY, US, vol. 32, No. 6, Article 165, Nov. 2013, pp. 1-11, XP058033914.
Yeh C-Y. et al., "Using Machine Learning to Predict Indoor Acoustic Indicators of Multi-Functional Activity Centers", Article, Applied Sciences, vol. 11, No. 12, Submitted May 28, 2021; Published Jun. 18, 2021, pp. 1-24, Obtained online: https://doi.org/10.3390/app11125641.
Xu, Z. et al, "Simulating room transfer functions between transducers mounted on audio devices using a modified image source method", J. Coust. Soc. Am., Sep. 8, 2023, Submitted Sep. 7, 2023, arXiv:2309.03486 [eess.AS], Cornell University Library.
Wang, H. et al., "An arbitrary high-order discontinuous Galerkin method with local time-stepping for linear acoustic wave propagation", The Journal of the Acoustical Society of America 149.1, publication date Jan. 25, 2021, pp. 569-580.
Wang, H. et al., "Time-domain impedance boundary condition modeling with the discontinuous Galerkin method for room acoustics simulations", The Journal of the Acoustical Society of America 147.4, 2020, pp. 2534-2546, Acoustical Society of America.
Thomas, M.R.P., "Practical Concentric Open Sphere Cardioid Microphone Array Design for Higher Order Sound Field Capture", ICASSP 2019—2019 IEEE International Conference on Acoustics, Speech and Signal Processing (ICASSP), pp. 666-670, IEEE.
Strøm, E. et al., "Massively Parallel Nodal Discontinous Galerkin Finite Element Method Simulator for Room Acoustics", Master thesis, Apr. 2020, pp. 1-133, Technical University of Denmark.
Singh, N. et al., "Image2Reverb: Cross-Modal Reverb Impulse Response Synthesis", submitted Aug. 13, 2021, pp. 1-22, arXiv:2103.14201v2 [cs.SD], obtained from internet: https://arxiv.org/abs/2103.14201.
Savioja, L. et al, "Overview of geometrical room acoustic modeling techniques", J. Acoust. Soc. Am., 138, published online Aug. 10, 2015, pp. 708-730.
Sanaguano-Moreno, D.A. et al, "A Deep Learning approach for the Generation of Room Impulse Responses", 2022 Third International Conference of Information Systems and Software Technologies (ICI2ST), IEEE, Nov. 8, 2022, pp. 64-71, IEEE.
Sakamoto, S. et al, "Calculation of impulse responses and acoustic parameters in a hall by the finite-difference time-domain method", Acoust. Sci. & Tech. 29, 4, 2008, accepted Feb. 1, 2008, pp. 256-265, The Acoustical Society of Japan.
Rumelhart, D.E. et al, "Learning Internal Representations by Error Propagation", Parallel Distributed Processing: Explorations in the Microstructure of Cognition: Foundations, Chapter 8, 1987, pp. 318-362, MIT Press.
Richard, A. et al., "Deep Impulse Responses: Estimating and Parameterizing Filters With Deep Networks",Feb. 7, 2022, pp. 1-5, arXiv:2202.03416v1 [cs.SD], obtained from Internet: https://arxiv.org/abs/2202.03416v1.
Reed, W. H. et al., "Triangular mesh methods for the neutron transport equation", Submitted to Proceedings of the American Nuclear Society by Los Alamos Scientific Laboratory, Oct. 31, 1973, pp. 1-23.
Ratnarajah, A. et al., "IR-GAN: Room impulse response generator for far-field speech recognition", INTERSPEECH 2021, 22nd Annual Conference of the International Speech Communication Association, Brno, Czechia, Aug. 30-Sep. 3, 2021, pp. 286-290, ISCA.
Pind, F. et al, "Time-domain room acoustic simulations with extended-reacting porous absorbers using the discontinuous Galerkin method", The Journal of the Acoustical Society of America 148.5, Nov. 24, 2020, pp. 2851-2863.
Pind, F. et al. "Time domain room acoustic simulations using the spectral element method", The Journal of the Acoustical Society of America 145.6, 2019, pp. 3299-3310, Acoustical Society of America.
Pind, F. et al, "A phenomenological extended-reaction boundary model for time-domain wave-based acoustic simulations under sparse reflection conditions using a wave splitting method", preprint submitted to Applied Acoustics Aug. 4, 2020, published Jan. 2021, vol. 172, 107596, pp. 1-29, DTU Library.
Pind Jörgensson, F. K., "Wave-Based Virtual Acoustics", Ph.D. Thesis, 2020, pp. 1-195, Technical University of Denmark.
Moreau, S. et al. ,"Study of Higher Order Ambisonic Microphone", CFA/DAGA'04, Strasbourg, Mar. 24-25, 2004, pp. 215-216.
Milo, A. et al, "Treble Auralizer: a real time Web Audio Engine enabling 3DoF auralization of simulated room acoustics designs", Presented at conference 2023 Immersive and 3D Audio: from Architecture to Automotive (I3DA), Sep. 5-7, 2023, Bologna, Italy, pp. 1-8, 10.1109/I3DA57090.2023.10289386.
Miccini, R. et al., "A hybrid approach to structural modeling of individualized HRTFs", 2021 IEEE Conference on Virtual Reality and 3D User Interfaces Abstracts and Workshops (VRW), Mar. 27, 2021, pp. 80-85, IEEE.
Melander, A. et al, "Massively parallel nodal discontinuous Galerkin finite element method simulator for room acoustics", Research Paper,The International Journal of High Performance Computing Applications 2023, vol. 0(0), published online Nov. 16, 2023, pp. 1-21, The Authors.

(56) References Cited

OTHER PUBLICATIONS

Majumder, S. et al, "Few-Shot Audio-Visual Learning of Environment Acoustics", 36th Conference on Neural Information Processing Systems (NeurIPS 2022), Nov. 22, 2022, p. 1-17, arXiv:2206.04006v2.
Kuttruff, H., "Room Acoustics: 6th edition", Dec. 10, 2019, pp. 1-302, CRC Press.
Ketkar, N., "Introduction to Keras", Deep learning with python: a hands-on introduction, Chapter 7, pp. 97-111, 2017, Kikhil Ketkar.
Käser, M. et al, "An arbitrary high-order discontinuous Galerkin method for elastic waves on unstructured meshes—I. The two-dimensional isotropic case with external source terms", Journal compilation, Geophys. J. Int. (2006) 166, accepted Apr. 26, 2006, pp. 855-887, The Authors.
Jameson, A. et al "Solution of the Euler equations for complex configurations", 6th Computational Fluid Dynamics Conference, paper No. 83-1929, pp. 1-11, 1983, American Institute of Aeronautics and Astronautics (AIAA), https://doi.org/10.2514/6.1983-1929.
Hu, F.Q. et al, "Low-dissipation and low-dispersion Runge-Kutta schemes for computational acoustics", Article No. 0052, Journal of Computational Physics 124, 1996, received Dec. 23, 1994, Revised Jul. 1995, pp. 177-191, Academic Press, Inc.
Hesthaven, J.S. et al, "Nodal Discontinuous Galerkin Methods, Algorithms, Analysis, and Applications", Texts in Applied Mathematics, Chapter 3, pp. 1-507, Springer, New York, 2008.
Hart, C. et al., "Machine-learning of long-range sound propagation through simulated atmospheric turbulence", article, The Journal of the Acoustical Society of America, American Institute of Physics, vol. 149, No. 6, published online Jun. 21, 2021, pp. 4384-4395, XP012257489.
Gabard, G. et al "A full discrete dispersion analysis of time-domain simulations of acoustic liners with flow", Manuscript, Journal of Computational Physics 273, Received date Nov. 25, 2013, Accepted date May 2, 2014, pp. 1-22, 10.1016/j.jcp.2014.05.004.
Funkhouser, T., "Survey of Methods for Modeling Sound Propagation in Interactive Virtual Environment Systems", Department of Computer Science of Princeton University, Jan. 1, 2003, pp. 1-53, XP055746257.
Dragna, D. et al "A generalized recursive convolution method for time-domain propagation in porous media", The Journal of the Acoustical Society of America 138.2, published online Aug. 20, 2015, pp. 1030-1042, https://doi.org/10.1121/1.4927553, Acoustical Society of America.
Dozat,T., "Incorporating Nesterov Momentum into Adam", Workshop track poster, ICLR May 2, 2016,pp. 1-4.
Denk, F. et al, "Equalization filter design for achieving acoustic transparency in a semi-open fit hearing device", Speech Communication; 13th ITG-Symposium, Oct. 10-12, 2018, Oldenburg, Germany, pp. 226-230.
Cosnefroy, M. "Propagation of impulsive sounds in the atmosphere: numerical simulations and comparison with experiments", Partly in French, PhD thesisPhD thesis, École Centrale de Lyon, Submitted Dec. 18, 2019, pp. 1-222.
Bilbao S. et al, "Local time-domain spherical harmonic spatial encoding for wave-based acoustic simulation", IEEE Signal Processing Letters, 26.4, Mar. 1, 2019, pp. 617-621, obtained from Internet: https://www.research.ed.ac.uk/en/publications/local-time-domain-spherical-harmonic-spatial-encoding-for-wave-ba.
Berland, J. et al, "Low-dissipation and low-dispersion fourth-order Runge-Kutta algorithm", Computers & Fluids 35.10, 2006, pp. 1459-1463.
Bansal, M. et al, "First Approach to Combine Particle Model Algorithms with Modal Analysis using FEM", Conventional Paper 6392, AES Convention 118, May 28-31, 2005, Barcelona, Spain, pp. 1-9, AES.
Bank, D. et al., "Autoencoders", Version 2, Submitted Apr. 3, 2021, pp. 1-22, Obtained from Internet: https://arxiv.org/abs/2003.05991v2.
Atkins, H.L et al, "Quadrature-Free Implementation of Discontinuous Galerkin Method for Hyperbolic Equations", AIAA Journal vol. 36, No. 5, May 1998, pp. 775-782, Downloaded by North Dakota State University.
Aretz, M., "Combined Wave and Ray Based Room Acoustic Simulations of Small Rooms", Logos Verlag Berling GmbH, Sep. 2012, pp. 1-211.
Anonymous, "Hybrid Model for Acoustic Simulation" May 15, 2021, pp. 1-6, XP93044320, obtained from Internet: https://reuk.github.io/wayverb/hybrid.html.
Abadi, M. et al, "TensorFlow: A system for large-scale machine learning", uploaded May 31, 2016, arXiv:1605.08695v2, published in Proceedings of the 12th USENIX conference on Operating Systems Design and Implementation, Nov. 2016, pp. 265-283, USENIX Association.

* cited by examiner

SYSTEMS AND METHODS FOR GENERATING DEVICE-RELATED TRANSFER FUNCTIONS AND DEVICE-SPECIFIC ROOM IMPULSE RESPONSES

CROSS-REFERENCE TO RELATED APPLICATIONS

The present application is a continuation of U.S. patent application Ser. No. 18/420,453, filed on Jan. 23, 2024 and claims priority to European Patent Application No. 23195400.9, filed on Sep. 5, 2023, and European Patent Application No. 23204159.0, filed on Oct. 17, 2023, each of which are hereby incorporated by reference in their entirety.

TECHNICAL FIELD

The present disclosure relates to acoustic impulse responses and transfer functions, and more specifically to device-specific room impulse responses and transfer functions.

BACKGROUND

Acoustic simulations refer to the computer-based modeling and simulation of sound propagation and interactions in various environments. These simulations are valuable tools in fields such as engineering, architecture and audio design, allowing researchers and professionals to predict, analyze, and optimize acoustic conditions in real-world scenarios. Acoustic simulations are often used to generate impulse responses and transfer functions of simulated object, whether to simulate an actual condition and determine where acoustic issues arise or when designing new object, e.g. buildings and room, in order to avoid acoustic problems in the architecture.

In acoustic simulation tools today the most dominant solvers used are ray based or image based, often referred to as geometrical solvers. These are fast and processor efficient but as they are ray based they do not take into account wave-based issues which for example causes them to be very bad at detecting wave-based phenomena such as standing waves, wave cancellation and similar issues. This is in particular an issue at lower or mid acoustic frequencies.

However, with increasing computational processing power being available e.g. through cloud computing, using so called wave-based solver becomes feasible. However, still due to computational constraints care has to be taken when implementing such method in order for them to provide a high-fidelity result as fast as possible.

Audio device modelling and optimization is a critical aspect of audio engineering. Current methods require time-consuming simulation methods or measurements in real-life conditions, in specific rooms equipped with several loudspeakers in order to be able to characterize how the sound is received by the audio device from several sound sources. Moreover, when considering how the device performs in a certain room or space, such simulation will have to take into account both the device geometry associated with its acoustic characteristics and the space or room geometry associated with its acoustic characteristics creating an even more complex and time consuming simulation.

Wave-based simulations such as finite element method (FEM), finite-difference time-domain method (FDTD), boundary element method (BEM) or finite volume method (FVM) are used in order to simulate acoustic waves with a high fidelity. One of the challenges of the previously mentioned wave-based simulations is the complexity of the calculations and the inability to parallelize computational resources, which makes it time-consuming. Some recent improvements has been performed in order to reduce the simulation time, especially by using the discontinuous Galerkin method (DG), which allows an efficient parallelization of the simulation, thereby drastically reducing the simulation time [1]. Wave-based simulations remain dependent on a meshing, which consists of meshing the inner volume of the 3D model and the geometry of the elements comprised in the 3D model, where the acoustic waves needs to be simulated by a wave-based simulation. The size of the mesh elements or geometrical features in the mesh dictates the time stepping of the wave-based simulation. Thereby, if complex geometries are comprised in the inner volume of the 3D model, the simulation time can become extremely long, sometimes up to days, if somehow the simulation can converge.

Audio device geometries are sometimes quite complex and relatively small compared to a size of a room on which they are arranged, and they may comprise several microphones. Simulating how the acoustic waves, thereby the sound may be captured by an audio device from one or more audio sources in a 3D model of a room can be challenging. This becomes drastically complex if the audio device comprises several microphones.

SUMMARY

Thus, there exists a need for making wave-based simulations and generation of impulse response and transfer function more effective, in particular when considering an object, such as an audio device in relation to its performance in a space or room, e.g. a meeting room. As disclosed here this can be achieved by performing separate simulations and generate impulse responses and transfer functions for the device in one step and the room in another step, such that the results can subsequently be combined to give a full evaluation of the device and room together, while allowing a rotation of the audio device without a cost of running additional simulations of impulse responses.

In one aspect, the present disclosure relates to a computer-implemented method for generating a device specific room impulse response (DSRIR) describing an acoustic characteristic of a device and a room as received by the device, wherein the device comprises at least a first microphone.

The computer implemented method further comprises steps to

- generate an at least first device related transfer function (DRTF), wherein the at least first device related transfer function describes the acoustic characteristic of the device as received by the at least first microphone
  - generate a spatial room impulse response (SRIR), wherein the spatial room impulse response describes the acoustic characteristic of the room from at least one room sound source in the room and received at an at least one listening point in the room from at least one direction, and
  - generating the device specific room impulse response (DSRIR) by combining the device related transfer function and the spatial room impulse response.

Generating the DRTF and the SRIR in two separate steps, e.g. by two separate simulations, can have the advantage that one large simulation is avoided which especially can be cumbersome in case wave-based solvers are used.

Wave-based solvers use meshes to solve and are in such cases limited by the smallest mesh in the model. As the device will typically be represented by much smaller mesh elements than the room, running a simulation with a meshed model in a room will become very slow. Even further, it is often desired to run several room simulations, either of different rooms or different listening points in order to evaluate how a device performs in such a room. Therefore, providing a method where the DRTF and the SRIR are generated separately but being able to be combined to a DSRIR provides a lot of options in generating new room, re-orient the device, or use a different device, at a higher speed than if everything was simulated in the same step while maintaining a high fidelity.

In one embodiment of the above aspect, such advantages become apparent in a computer-implemented method for generating a device specific room impulse response (DSRIR) describing an acoustic characteristic of a device and a room as received by the device, wherein the device comprises at least a first microphone, the method comprises

- generate an at least first device related transfer function (DRTF), wherein the at least first device related transfer function describes the acoustic characteristic of the device as received by the at least first microphone, wherein generating the first device related transfer function further comprises
  - obtain a device mesh model representing the geometry of the device and the position of the at least first microphone on the device mesh model,
  - arrange a digital representation of a device receiver array comprising a plurality of digital representations of device receivers around the device mesh model, such that the distance between any of the digital representations of the device receivers and the device mesh model is not below a predetermined distance,
  - determine on the device mesh model a first closest mesh element, which is closest to the at least first microphone,
  - arrange a digital representation of a first source correction microphone located at a first source distance from the first closest mesh element, wherein the first source distance is smaller than the predetermined distance,
  - digitally emit a first impulse signal using the first closest mesh element as a sound source,
  - determine a first source correction signal using a wave-based solver, where the first source correction signal describes the first impulse signal as received at the first source correction microphone,
  - determine a plurality of first device impulse responses using a wave-based solver, and where each first device impulse response describes the impulse response of the first impulse signal received at the respective device receiver,
  - determine a plurality of first source corrected device impulse responses by source correcting each of the plurality of first device impulse responses using the first source correction signal,
  - generate the first device related transfer function of the device for the first microphone by combining the plurality of first source corrected device impulse responses,
  - determine an energy content for at least one frequency of the first device related transfer function,
- generate a spatial room impulse response (SRIR), wherein the spatial room impulse response describes the acoustic characteristic of the room from at least one room sound source in the room and received at an at least one listening point in the room from at least one direction, wherein generating the spatial room impulse response further comprises
  - obtain a 3D room model representing the geometry of the room and at least one acoustic characteristic,
  - arrange at least one digital representation of at least one room sound source in the 3D room model,
  - arrange a digital representation of a room receiver array comprising a number of digital representations of room receivers, wherein the room receiver array is centred on an at least one listening point in the 3D room model and where the number of digital representations of room receivers are determined based on the energy content for the at least one frequency of the first device related transfer function,
  - digitally emit a room impulse signal from the at least one audio sound source,
  - determine a number of room impulse responses using at least a wave-based solver for at least one wave-based frequency, where each room impulse response describes the emitted room impulse as received at a corresponding one of the number of digital representations of room receivers,
  - generate a spatial room impulse response based on the number of room impulse responses,
- generating the device specific room impulse response (DSRIR) by combining the device related transfer function and the spatial room impulse response.

This embodiment is for example suitable to be used for ambisonics as the device receiver array used for generating the first DRTF and the room receiver array SRIR can be dimensioned to use spherical harmonics to encode and decode to and from ambisonics. For example, the number of receivers in the device array determines the highest ambisonics order N based on (N+1)^2. Similarly the spatial impulse response for the room can be encoded to ambisonics using spherical harmonics, where the number of receivers in the room array determines the highest ambisonics order N also based on (N+1)^2.

Using spherical harmonics to encode and decode ambisonics is generally known but as mentioned, it can be a compute-intensive process which lately has become more feasible within increased computing power available. However, controlling and using the optimal ambisonics order N will allow the system to be more effective and efficient.

Since the wave-based simulation used to derive the device related transfer function DRTF is done in a smaller space, e.g. within the device receiver array, the ambisonics order N(device) for the device can generally be higher. However, for the room based simulation used for determining the spatial room impulse response SRIR, the wave-based simulation is generally done for a larger space. Therefore, determining the optimal ambisonics order N(room) for the room, e.g. by using the energy content from the device simulation, will allow for faster but still high fidelity result.

The wave-based simulation as discussed above can also partly be a geometrical acoustic simulation. By combining or merging a wave-based simulation and a geometrical acoustic simulation, this may allow for an optimal simulation when considering speed of simulation vs accuracy.

In one embodiment, the device receiver array encompasses the device, which involves an interior problem.

In a further embodiment, the room receiver array processing involves additional mathematical steps to solve an exterior problem.

With the device related transfer function and the spatial room impulse response encoded into ambisonics, it is generally straightforward to combine them into the device specific room impulse response at an ambisonics order corresponding to the lowest of the N(device) or N(room). This also allows the device to be oriented/rotated freely relative to the room as the ambisonics encoding contains spatial positioning information.

As the computer implemented method as discussed herein is performed on a processor, computer or similar device for executing computer implemented methods, it should be understood that the steps are generally digitally executed unless described otherwise. Thus, reference to e.g. receivers, microphones, emitter, speakers, sound sources should be understood to be digital representation simulating or emulating the function of a corresponding physical part.

Similarly, the device model and the room model are also digital representation of physical or potentially physical elements and can be represented as meshes or other digital representations.

Although the signals emitted, received, simulated or generated also are used in a digital environment e.g. within a simulation, these may be processed through e.g. a digital-to-analog converter (DAC) in order to be played in a physical environment. For example the device specific room impulse response (DSRIR) may be convolved with an anechoic sound signal to generate physical audio experience of how a specific device receives sound in a specific room.

DETAILED DESCRIPTION

In one embodiment, generating the device related transfer function comprises obtaining a 3D device model representing the geometry of the device and the position of the least first microphone on the 3D device model. The 3D device model may for example be a device mesh model representing the geometry of the device and the position of the at least first microphone on the device mesh model. Meshing can be understood as a common way of generating models in a digital environment such as computers. A mesh can be preferably a discretization of a geometry into small, simple shapes. Shapes can be triangles or quadrilaterals in 2D, and/or tetrahedra or hexahedra in 3D. A mesh density control can determine the appropriate mesh density, as too coarse a mesh may lead to inaccurate results, while an excessively fine mesh can increase computational cost and simulation time, or sometimes lead to a non-convergence of the simulation using the mesh.

A mesh can be understood as a polygon mesh, which is a collection of vertices, edges and faces that defines the shape of a polyhedral object. Throughout this patent application, the term mesh elements can be faces, such as triangles, quadrilaterals, other simple convex polygons, or any other combinations thereof.

In one embodiment, at least one direction is at least two directions, at least three directions, at least four directions, at least five directions.

Obtaining the 3D device model can be done in different ways. A physical device can for example be scanned in order to obtain the 3D device model. The 3D device model may have been digitally obtained by modelling the 3D device model, e.g. using a CAD (Computer Aided Design) software. The 3D device model may also have been obtained by loading a file onto the computer, e.g. an STL file which is a common format for storing digital models.

In another embodiment, generating the device related transfer function comprises arrange a digital representation of a device receiver array comprising a plurality of digital representations of device receivers around the 3D device model, such as the device mesh model. The device receiver array is arranged such that the distance between any of the digital representations of the device receivers and the 3D device model is not below at predetermined distance.

In one embodiment the shape of the device receiver array comprising the plurality of digital representations of device receivers is a sphere. Alternatively, the shape may be an off-set shape where the digital representations of the device receiver are placed/arranged at a predetermined off-set distance from the device mesh model. The predetermined off-set distance may be the same as the predetermined distance discussed herein.

The predetermined distance may for example comprise the radius of the device receiver array and an additional distance in order to properly surround the 3D device model. This can for example be determined such that the distance from any device receiver on the array to any point on the 3D model of the device is preferably not below the predetermined distance.

In one embodiment, the predetermined distance is between 0.5-1.5 meters, preferably 0.8-1.2 meters or most preferred 1 meter. Such predetermined distance has shown to be a good choice for general room simulations, or preferably for generating and/or simulating a transfer function of a device.

The predetermined distance may for example be used to determine the ambisonics order N if this is used for encoding and decoding. For example, the ambisonics order N can be determined using the formula N>2*pi*f*R(array)/c, where 'f' is the considered frequency and 'c' is the sound speed. The sound speed is typically 343 m/s, but it can depend on temperature as well as the medium through which a sound wave is propagating. In that case, R(array) can be the predetermined distance. Determining the minimal order N can then be used to select the number of device receivers in the device receiver array which is determined by (N+1)2. This can for example be multiplied by a factor, e.g. 1.5 or 2.0 in order to obtain higher fidelity but also at the cost of increased simulation time.

When applying wave-based solvers to generate an at least first device related transfer function for a device comprising at least one microphone, it is generally the number of sound sources that determines the time and resources required to determine acoustic simulation. Thus, if the at least one microphone was set to function as a microphone and emit an impulse signal, all the receivers in the device array would have to function as sound sources and emit an impulse signal. However, each of these would have to be solved individually and the time and resources used for solving would increase significantly based on the number of sound sources in the receiver array. Instead, for determining the device related transfer function as discussed here, a first impulse signal may advantageously be emitted using the first microphone as a sound source, using the law of reciprocity.

In one embodiment where the 3D device model is a mesh model, a first closest mesh, which is closest to the at least first microphone on the 3D device model can be determined. The first closest mesh element may in one embodiment be used a sound source for emitting the first impulse signal. By having and/or identifying a first closest mesh element closest to the at least first microphone on the 3D device model, a sound source for emitting the first impulse signal can be set up.

Based on the emitted first impulse response, a plurality of first device impulse responses may thus be determined using a wave-based solver, where each first device impulse response may describe the impulse response of the first impulse signal received at the respective device receiver.

The first device related transfer function of the device for the first microphone may thus be generated by combining the plurality of first device impulse responses.

The first impulse signal should preferably be a perfect impulse and have a flat spectrum. However, this may not be possible and in order to increase the fidelity of the generated device related transfer function, the first device impulse responses should preferably be source-corrected by a reference signal.

This can in one embodiment be done by arranging a digital representation of a first source correction microphone located at a first source distance from the at least first microphone or the first closest mesh element, wherein the first source distance is smaller than the predetermined distance.

A first source correction signal may thus be determined using a wave-based solver, where the first source correction signal describes the first impulse signal as received at the first source correction microphone.

A plurality of first source corrected device impulse responses can then be determined by source correcting each of the plurality of first device impulse responses using the first source correction signal, and the first device related transfer function of the device for the first microphone can then be determined by combining the plurality of first source corrected device impulse responses.

In one embodiment, generating the device related transfer function comprises determining an energy content for at least one frequency of the first device related transfer function. As will be discussed, this can for example be used to determine the ambisonics order N which can be used when generating the spatial room impulse response SRIR.

In one embodiment, determining the energy content for the at least one frequency of the first device related transfer function comprises determining different ambisonics orders corresponding to different levels of energy content.

In one embodiment, determining the energy content for at least one frequency of the first device related transfer function comprises determining the ambisonics order N for the energy content of the at least one frequency.

In a further embodiment, the ambisonics order N is determined for multiple frequencies, where the energy content for each frequency is determined.

In yet a further embodiment, determining the ambisonics order N for the energy content is based on determining the energy content as a sum of the ambisonics coefficients for each order N and then normalized to unity for each frequency.

In one embodiment, the energy content is determined for a range of frequencies, such as from 0 to 20 kHz, such as 0 to 10 kHz, such as 10 to 20 kHz, such as 0 to 9 kHz, such as 0 to 8 kHz, such as 0 to 7 kHz, such as 0 to 6 kHz, such as 0 to 5 kHz, such as 0 to 4 kHz, such as 0 to 3 kHz, such as 0 to 2 kHz, such as 0 to 1 kHz. Preferably, the range of frequencies may be comprised in the audible spectrum. The maximum frequency of the range may dictate the ambisonics order N to be chosen. Generally, a higher maximum frequency requires a larger ambisonics order N.

In one embodiment, the device comprises a plurality of microphones, such as a second, third, fourth, fifth microphone. In such a case the computer implemented method as discussed herein is repeated for each microphone. In other words, each of the plurality of microphones can be treated as the first microphone such that a plurality of device related transfer functions, such as a second, third, fourth, fifth device related transfer function of the device is generated for each of the microphones.

In one embodiment, generating an at least first device related transfer function (DRTF) comprises obtain a 3D box model comprising high acoustic absorption surfaces, or a 3D box model with a predefined size such that the first impulse signal received from the sound source to each of the plurality of digital representations of device receivers do not comprise reflections caused by the surfaces of the 3D box model, arrange the device receiver array and the device mesh model in the 3D box model.

By obtaining a 3D box model comprising high acoustic absorption surfaces, the first impulse signal emitted from the first closest mesh element is not reflected by the surfaces of the 3D box model, thereby not being received by the digital representation of the device receiver array comprising a plurality of digital representations of device receivers. Preferably, the plurality of digital representations of device receivers may receive the incoming impulse signal and preferably not the reflections caused by any surfaces, obstacles or geometries external to the digital representation of the device receiver array. In another embodiment, the 3D box model has a predefined size such that the first impulse signal received from the sound source to each of the plurality of digital representations of device receivers do not comprise reflections caused by the surfaces of the 3D box model. The predefined size may be estimated such as the surfaces are far away from the plurality of digital representations of device receivers. Having a predefined size too high may be costly in terms of computation cost and time, thereby the predefined size should be estimated and/or calculated such as the simulation of the impulse signal propagation may get stopped before the impulse signal reaches the surfaces of the 3D box model or substantially reaches the surfaces of the 3D box model.

As an alternative, the 3D box model can be a 3D spherical model. Preferably, the 3D spherical model can consist of a sphere.

In one embodiment, generating the spatial room impulse response comprises obtain a 3D room model representing the geometry of the room and at least one acoustic characteristic. As discussed above, obtaining a 3D model, such as the 3D room model, can be done in different ways.

Furthermore, the 3D room model may comprise at least one acoustic characteristic which for example can be acoustic absorption values for different materials included in the 3D room model and can be different for different elements in the model such as elements representing windows, carpet, furniture etc. The at least one acoustic characteristic can be a complex surface impedance.

In one embodiment, at least one digital representation of at least one room sound source is arranged in the 3D room model. The at least one room sound source may for example be an omnidirectional sound source or a directional sound source.

In a further embodiment, generating the spatial room impulse response may further comprise arrange a digital representation of a room receiver array comprising a number of digital representations of room receivers, wherein the room receiver array is centred on an at least one listening point in the 3D room model.

The number of digital representations of room receivers may in one embodiment be determined based on the energy content for the at least one frequency of the first device related transfer function. Preferably, the energy content may generate the information on the ambisonics order to be used, thereby generating the information of the number of receivers to be used in the digital representation of room receivers.

In one embodiment, where the number of digital representations of room receivers are determined based on the energy content for at least one frequency of the device related transfer function (DRTF) further comprises determining the number of digital representation of room receivers based on the ambisonics order N, where the number of digital representations of room receivers can be (N+1)2, 1.5*(N+1)2 or 2*(N+1)2. Having more digital representations of room receivers may give a better accuracy, at the cost of a larger amount of data generated.

In a further embodiment, generating the spatial room impulse response may comprise digitally emit a room impulse signal from the at least one audio sound source. A number of room impulse responses using at least a wave-based solver for at least one wave-based frequency may be determined, where each room impulse response describes the emitted room impulse signal as received at a corresponding one of the number of digital representations of room receivers. A spatial room impulse response may be based on the number of room impulse responses.

In a further embodiment, generating the spatial room impulse response may comprise determine a second number of room impulse responses using at least a geometrical acoustic solver for at least one geometrical acoustic frequency.

The number of impulse responses generated using the wave-based solver and the second number of room impulse responses generated using the geometrical acoustic solver may in one embodiment be merged to generate a number of merged room impulse responses.

For example, in a further embodiment, the number of room impulse responses generated using the wave-based solver may be generated in low frequencies of an acoustic spectrum and the second number of impulse responses may be generated using the geometrical acoustic solver in high frequencies of the acoustic spectrum.

The acoustic spectrum can for example be between 0 and 20 kHz, such as between 0 and 15 kHz, such as between 0 and 12 kHz, such as between 0 and 10 kHz, such as between 0 and 8 kHz, such as between 0 and 6 kHz, such as between 20 Hz and 20 kHz, such as between 20 Hz and 15 kHz, such as between 20 Hz and 12 kHz, such as between 20 Hz and 10 KHz, such as between 20 Hz and 8 kHz, such as between 20 Hz and 6 KHz. Preferably, the acoustic spectrum as defined herein may preferably be the acoustic spectrum as being heard by humans. Some frequency ranges of the acoustic spectrum may preferably be more useful for such acoustic applications such as human speech, where most of the human speech frequencies can generally be comprised between 100 to 17 kHz, where fundamentals and harmonics of human voice can be comprised. Male voice may cover a frequency range of 100 Hz to 8 kHz, while female voice can cover a frequency range of 350 Hz up to 17 kHz.

In one embodiment, the low frequencies of the acoustic spectrum are comprised between 0 and 20 kHz, such as between 0 and 15 kHz, such as between 0 and 12 kHz, such as between 0 and 10 KHz, such as between 0 and 8 kHz, such as between 0 and 6 kHz, such as between 20 Hz and 20 kHz, such as between 20 Hz and 15 kHz, such as between 20 Hz and 12 kHz, such as between 20 Hz and 10 kHz, such as between 20 Hz and 8 kHz, such as between 20 Hz and 6 kHz, such as between 20 Hz and 5 kHz, such as between 20 Hz and 4 kHz, such as between 20 Hz and 3 kHz, such as between 20 Hz and 2 kHz, such as between 20 Hz and 1.5 kHz, such as between 20 Hz and 1 kHz.

In one embodiment, the high frequencies of the acoustic spectrum are comprised between 1 kHz and 20 kHz, such as between 1.5 kHz and 20 kHz, such as between 2 kHz and 20 KHz, such as between 3 kHz and 20 kHz, such as between 4 kHz and 20 KHz, such as between 5 kHz and 20 KHz, such as between 6 KHz and 20 KHz, such as between 8 kHz and 20 kHz, such as between 10 KHz and 20 kHz, such as between 12 kHz and 20 kHz, such as between 1 kHz and 15 kHz, such as between 1.5 kHz and 15 kHz, such as between 2 kHz and 15 kHz, such as between 3 kHz and 15 kHz, such as between 4 kHz and 15 kHz, such as between 5 kHz and 15 kHz, such as between 6 kHz and 15 kHz, such as between 8 KHz and 15 kHz, such as between 10 KHz and 15 kHz, such as between 12 kHz and 15 kHz, such as between 1 kHz and 12 kHz, such as between 1.5 kHz and 12 kHz, such as between 2 kHz and 12 kHz, such as between 3 kHz and 12 kHz, such as between 4 kHz and 12 kHz, such as between 5 KHz and 12 kHz, such as between 6 kHz and 12 kHz, such as between 8 kHz and 12 kHz, such as between 10 KHz and 12 KHz.

As discussed herein, using ambisonics to encode and decode acoustic signals may have many advantages and in particular when treating high fidelity acoustic data and signals it can provide a flexible way to communicate with many different applications and uses. For example, as the first (and possible further) device related transfer functions and spatial impulse response are generated separately but linked by the energy content, which for example can be used to determine the ambisonics order N, it is possible to e.g. rotate the device relative to the room. A new device related transfer function can be generated for a new device and combined with an already generated spatial room impulse response having corresponding ambisonics order N (or higher), or vice versa, a new spatial room impulse response can be generated for a new room.

In one embodiment, the generated device specific room impulse response may thus be encoded and decoded using ambisonics. However, generating the device specific room impulse response (DSRIR) by combining the device related transfer function and the spatial room impulse response may be avoided and the at least first device related transfer function (DRTF) and the spatial impulse response (SRIR) may be processed individually or further processed in a matrix. For instance, the DSRIR can be used to analyze the sound field in the room or around the device, or to generate spatial sound field visualizations.

In one embodiment of the above aspect, such advantages become apparent in a computer-implemented method for generating a device specific room impulse response (DSRIR) describing an acoustic characteristic of a device and a room as received by the device, wherein the device comprises at least a first microphone, the method comprises

- generate an at least first device related transfer function (DRTF), wherein the at least first device related transfer function describes the acoustic characteristic of the device as received by the at least first microphone, wherein generating the first device related transfer function further comprises
  - obtain a device mesh model representing the geometry of the device and the position of the at least first microphone on the device mesh model,
  - arrange a digital representation of a device receiver array comprising a plurality of digital representations of device receivers around the device mesh model, such that the distance between any of the digital representations of the device receivers and the device mesh model is not below at predetermined distance, determine on the device mesh model a first closest mesh element, which is closest to the at least first microphone, arrange a digital representation of a first source correction microphone located at a first source distance from the first closest mesh element, wherein the first source distance is smaller than the predetermined distance, digitally emit a first impulse signal using the first closest mesh element as a sound source, determine a first source correction signal using a wave-based solver, where the first source correction signal describes the first impulse signal as received at the first source correction microphone, determine a plurality of first device impulse responses using a wave-based solver, and where each first device impulse response describes the impulse response of the first impulse signal received at the respective device receiver, determine a plurality of first source corrected device impulse responses by source correcting each of the plurality of first device impulse responses using the first source correction signal, generate the first device related transfer function of the device for the first microphone by combining the plurality of first source corrected device impulse responses, determine an energy content for at least one frequency of the first device related transfer function, generate a spatial room impulse response (SRIR), wherein the spatial room impulse response describes the acoustic characteristic of the room from at least one room sound source in the room and received at an at least one listening point in the room from at least one direction, wherein generating the spatial room impulse response further comprises obtain a 3D room model representing the geometry of the room and at least one acoustic characteristic, arrange at least one digital representation of at least one room sound source in the 3D room model, arrange a digital representation of a room receiver array comprising a number of digital representations of room receivers, wherein the room receiver array is centred on an at least one listening point in the 3D room model and where the number of digital representations of room receivers are determined based on the energy content for the at least one frequency of the first device related transfer function, digitally emit a room impulse signal from the at least one audio sound source, determine a number of room impulse responses using at least a wave-based solver for at least one wave-based frequency, where each room impulse response describes the emitted room impulse as received at a corresponding one of the number of digital representations of room receivers, generate a spatial room impulse response based on the number of room impulse responses, generating the device specific room impulse response (DSRIR) by combining the device related transfer function and the spatial room impulse response.

DESCRIPTION OF THE DRAWINGS

In the following embodiments and examples will be described in greater detail with reference to the accompanying drawings.

DETAILED DESCRIPTION OF THE DRAWINGS

Figure 1:
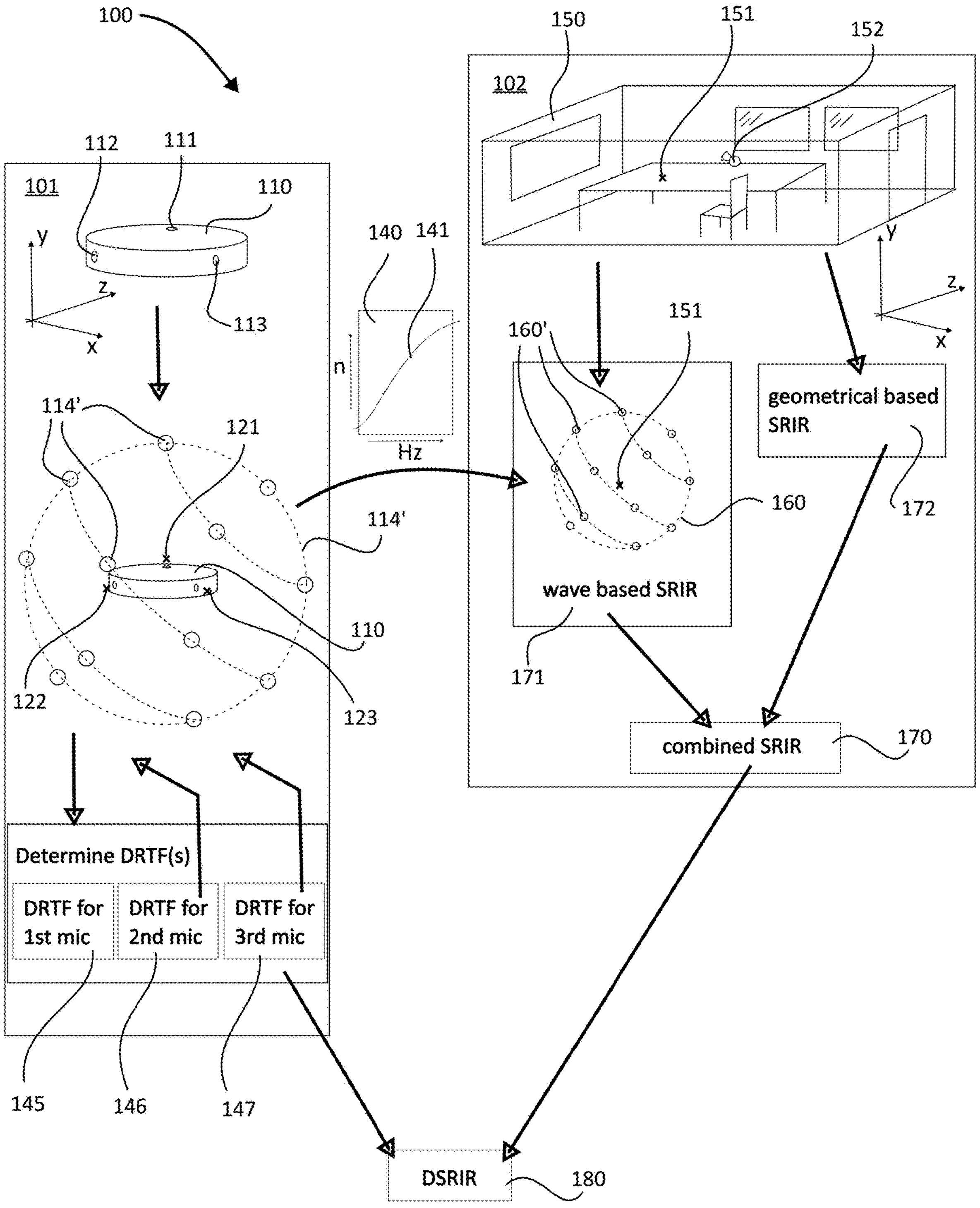
FIG. 1 illustrates schematically an embodiment of a method of generating a device specific room impulse response as disclosed here.

A computer implemented method for generating a device specific room impulse response 100 as discussed herein is shown schematically in FIG. 1.

The method can be considered to be formed of two sub-methods, one shows a method for generating a device related transfer function (DRTF) 101, and the other shows a method for generating a spatial room impulse response (SRIR) 102.

For generating a device related transfer function a 3D model of the device 110 is provided as an input to the method. The 3D model of the device 110 comprises three microphones, a first microphone 111, a second microphone 112 and a third microphone 113.

When entering the method the 3D model of the device 110 is meshed if not already meshed as a model and placed in a simulation tool which applies a wave-based solver. As should be understood herein a wave-based solver applies wave-based methods that may apply numerical techniques to directly solve governing partial differential equations that describe wave motion in a virtual domain, such as representing an air volume. This can for example be a wave equation in the time domain or the Helmholtz equation in the frequency domain. The concept of the different wave-based methods is thus to divide the virtual domain of interest into small subdomains (discretization) and solve algebraic equations on each subdomain. Accordingly, wave-based methods used in wave-based solvers as disclosed herein may be understood to be methods that solve the partial differential equations using discretization techniques. The Treble simulation tool can for example be used for performing such wave-based simulation using a wave-based solver.

A device array of receivers 114 are arranged around the 3D model of the device 110 comprising a plurality of device receivers 114' (for simplicity in the drawing not all are indicated with a reference number). In the current case, the array of device receivers 114 forms a spherical pattern around the 3D model of the device 110. A spherical pattern is often preferred as this facilitates using spherical harmonics to encode the signals into ambisonics. Preferably, the spherical pattern may be a Lebedev grid.

The radius of the array of receivers is determined such that the distance from any receiver on the array to any point on the 3D model of the device is not below a predetermined distance, which in the current example is set to 1 meter, which has shown to be a good choice for general room simulations to ensure far-field sound radiation conditions. The ambisonics order N can be determined using the formula N>2*pi*f*R(device)/c, where ‘R(device)’ is the largest distance from the center of the array of receivers to any point on the 3D model of the device, ‘f’ is the considered frequency and ‘c’ is the sound speed (typically 344 m/s). Determining the minimal order N can then be used to select the number of receivers necessary in the array which is determined by (N+1)2. This can for example be multiplied by a factor, e.g. 1.5 or 2.0 in order to obtain higher fidelity but also at the cost of increased data generation and simulation time.

However, other patterns could be used where an additional step of e.g. transposing the shape onto a sphere could be used for spherical harmonics. Such a pattern could for example be an offset from the surface of the 3D model of the device with a predetermined distance, for example 1 meter as discussed.

The microphones 111, 112 and 113 on the 3D model of the device 110 are then set to function as sound sources. Although not shown, this can for example be done by determining the closest mesh element on the meshed model for each microphone and use the closest mesh elements for virtually emitting an impulse signal as will be described. A remeshing step could be performed to re-mesh the closest mesh element to a specific size or shape so as to resemble the dimensions of the microphone as close as possible. Preferably, a preliminary meshing step is performed such as the location of the microphone are specified as an input to a meshing tool being used, thereby generating appropriate mesh elements located at the microphone locations.

Switching the function of the microphone on the device to function as a sound source such as a speaker or other sound emitter increases the speed of the subsequent wave-based solver considerably as a number of sound sources affect the processing speed considerably. Thus, in case the microphones on the device are set to function as microphones, each receiver 114' in the array of receivers 114 would have to function as sound sources which will increase the processing time greatly since the number of receivers in the array generally greatly exceeds the number of microphones on the device. Thus, being able to switch the functions around for the wave-based simulation reduces the time significantly and is one large advantage of using a computer implemented simulation tool such as the Treble software.

The method will then perform, one at a time, a wave-based simulation for each microphone 111, 112, 113 where the microphone, or in this case the corresponding closest mesh element, emits an impulse and the signal received at each receiver 114' in the array is recorded.

Ideally, the impulse will have a flat spectrum, however, this is typically not possible. Thus, a source correction of the signal received at each receiver is performed [2]. The reference signal used for source correction is recorded using a source correction receiver 121, 122, 123 placed very close to the microphone functioning as a speaker, for example 1 mm in front of the microphone or the mesh used as an emitter. Thus, in the current embodiment three source correction receivers 121, 122 and 123 are placed 1 mm in front of the microphones 111, 112 and 113 or the respective closest meshes.

The source-corrected signals received at each array receiver for the impulse from one of the microphones on the device forms a transfer function describing the specific microphone. Thus, in the current case, as there are three microphones on the device, three distinct transfer functions, also described as the first 145, second 146 and third 147 device related transfer function herein, are generated and together they form the general device related transfer function, which for example can be stored as a three dimensional matrix.

In addition to the first, second and third device related transfer functions, the method for generating a device related transfer function also generates an energy map after encoding to ambisonics. The energy map 140 is generated where the energy at different frequencies (Hz) is used to determine the ambisonics order (n) and can be used in the room simulation (when generating the spatial room impulse response as will be discussed) to provide an efficient simulation and an ambisonics encoding and decoding that allows for the device to be freely rotated as will be discussed in the following. For example, in the current case, a frequency to ambisonics curve 141 is determined indicating the level where the energy content is 95% at the respective frequencies along the x-axis and is used to determine the ambisonics order (n) on the y-axis.

The method for generating a spatial room impulse response 102 uses a 3D room model 150 which represents the geometry of a room as input. In the room model, a sound source 152 and a listening point 151 are arranged. The 3D room model may also include geometries of furniture, such as tables and chairs, door openings and/or monitors. It may also include acoustic characteristics of the different geometries and materials, such as windows, carpets, different wall materials, etc.

The spatial room impulse response 170 is subsequently determined based on a wave-based spatial room impulse response 171 for the low to mid frequency range and a geometrical acoustic spatial room impulse response 172 for the mid to high frequency range of the audible spectrum.

The spatial impulse responses 171 and 172 embeds spatio-temporal information regarding direction of arrival of incoming acoustic waves at the receiver position. Typically, a spatial impulse response comprises a plurality of single channel impulse responses, where each impulse response records the sound from a specific direction or angle at the same listening point.

The wave-based spatial impulse response 171 can be constructed in a simulation by emitting an impulse signal from the sound source 152 and record a number of room impulse response at multiple room receivers 160' around the listening point 151 in a room receiver array 160. The room receiver array comprising the room receivers 160' (for simplicity in the drawing not all are indicated with a reference number) arranged in a spherical array shape around the listening position 151. The receivers may either be omnidirectional or with cardioid directivity pattern to optimize the operating frequency range of the array.

The number of receiver(s) and the size used in the room receiver array is initially determined by the ambisonics order N derived from energy map 140 where the ambisonics curve shows the order N for a desired frequency range for which the wave-based spatial impulse response 171 is determined. Knowing the order N, the number of receivers 160' can be decided as discussed above by (N+1)2, which for example can be multiplied by a factor, e.g. 1.5 or 2.0 for higher fidelity.

Further, the radius of the array R(array) can be determined using the formula discussed above N>2*pi*f*R(array)/c. For a given ambisonics order N and radius R(array), this imply that the maximum frequency is constrained due to spatial aliasing as f<N*c/(2*pi*R(array)). R(array) must therefore be chosen in accordance with the maximum frequency of interest. Once the impulse response has been recorded for all the receivers in the array, the spatial impulse response can be encoded into ambisonics.

The geometrical acoustic spatial impulse response 172 can be determined by analyzing the incoming directions of all image sources and rays at the listening point 151 using commonly-applied image source and ray tracing techniques. A geometrical acoustics spatial impulse response can then be straightforwardly generated and encoded into ambisonics.

The wave-based spatial room impulse response 171 and the geometrical acoustic spatial room impulse response 172 can subsequently be combined or hybridized to the combined spatial room impulse response 170. In some cases, either the wave-based spatial room impulse response or the geometrical acoustic spatial room impulse response can be further used independently.

Thus, the device specific room impulse response 180 is provided by the first 145, second 146 and third 147 device related transfer function herein are generated and together they form the general device related transfer function, which for example can be stored as a matrix, and the combined spatial room impulse response 170.

Figure 2:
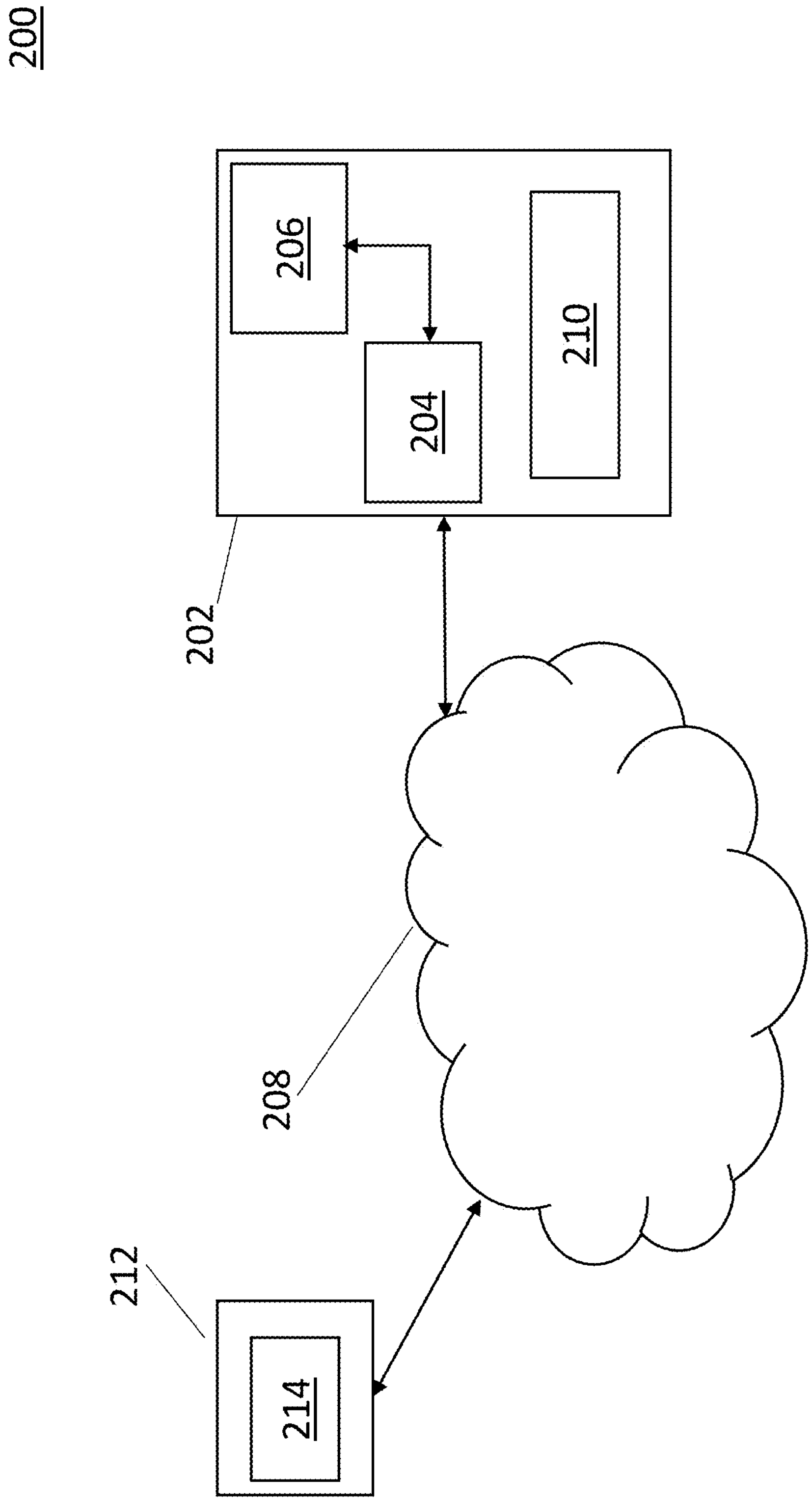
FIG. 2 illustrates a system for generating a device-specific room impulse response in accordance with an embodiment of the present invention.

FIG. 2 shows a system 200 for generating a device-specific room impulse response (DSRIR) in accordance with an embodiment of the present invention. System 200 includes a computer system 202. Computer system 202 includes specialized hardware and/or software modules that execute on a processor 204 coupled to a memory 206. The computer system 202 may also be communicatively coupled to a communications network 208. Network 208 may be a public network, such as the internet, or it may be a private network, such as a network internal to a company. Network 208 also may be a combination of public and/or private networks. The computer system 202 may be coupled to the network 208 directly, for example via an Ethernet cable or via wireless connection such as Wi-Fi. Computer system 202 may also be coupled to the network 208 in any other way known to the skilled person, for example indirectly through another device (not shown), such, as, but not limited to, a router, a switch, a hub, a separate computer system, a mobile device, a modem, and/or a combination of these devices. The processor 204 is configured to execute any of the methods described above in detail with reference to FIG. 1 and throughout the present disclosure.

The computer system 202 further includes an impulse response generation module 210 executing on processor 204. The impulse generation module 210 is configured to execute any of the methods described above in detail with reference to FIG. 1 and throughout the present disclosure. In some embodiments, module 210 includes specialized sets of computer software instructions programmed onto one or more dedicated processors in computer system 202 and can include specifically designed memory locations and/or registers for executing the specialized computer software instructions.

Although module 210 is shown in FIG. 2 as executing within the same computer system 202, it is expressly noted that the functionality of module 10 can be distributed among a plurality of computer systems. Computer system 202 enables module 210 to communicate with other systems and/or modules in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of module 210 is described in detail throughout the specification.

In some embodiments, a device 212 is included in system 200. The device 210 includes at least one microphone 214. Illustratively, the device 212 is shown in FIG. 2 as coupled to network 208. However, it is expressly contemplated that the device 212 may not be coupled to network 208. Instead, the device 212 may be communicatively coupled directly to computer system 202, and/or it may be a part of computer system 202. While only one microphone 214 is shown in FIG. 2, it is noted that the device 210 may include more than one microphone.

REFERENCE LIST

F. Pind, “Wave-based Virtual Acoustics”, 2020, Technical University of Denmark—orbit.dtu.dk/en/publications/wave-based-virtual-acoustics.

S. Sakamoto et al., “Calculation of impulse responses and acoustic parameters in a hall by the finite-difference time-domain method”, Acoust. Sci. & Tech. 29, 4 (2008).

Embodiment List

Disclosed herein are the following embodiments.

1. A computer-implemented method for generating a device specific room impulse response (DSRIR) describing an acoustic characteristic of a device and a room as received by the device, wherein the device comprises at least a first microphone, the method comprises,
   - generate an at least first device related transfer function (DRTF), wherein the at least first device related transfer function describes the acoustic characteristic of the device as received by the at least first microphone,
   - generate a spatial room impulse response (SRIR), wherein the spatial room impulse response describes the acoustic characteristic of the room from at least one room sound source in the room and received at an at least one listening point in the room from at least one direction.
2. The computer-implemented method according to item 1, wherein the at least one direction is at least two directions, at least three directions, at least four directions, at least five directions.
3. The computer-implemented method according to item 1, wherein the computer-implemented method further comprises,
   - generating the device specific room impulse response (DSRIR) by combining the device related transfer function and the spatial room impulse response.
4. The computer implemented method according to item 1, wherein generating the device related transfer function comprises,
   - obtain a device mesh model representing the geometry of the device and the position of the at least first microphone on the device mesh model,
   - arrange a digital representation of a device receiver array comprising a plurality of digital representations of receivers around the device mesh model, such that the distance between any of the digital representations of the receivers and the device mesh model is not below at predetermined distance,
   - determine on the device mesh model a first closest mesh element, which is closest to the at least first microphone,
   - arrange a digital representation of a first source correction microphone located at a first source distance from the first closest mesh element, wherein the first source distance is smaller than the predetermined distance,
   - digitally emit a first impulse signal using the first closest mesh element as a sound source,
   - determine a first source correction signal using a wave-based solver, where the first source correction signal describes the first impulse signal as received at the first source correction microphone,
   - determine a plurality of first device impulse responses using a wave-based solver, and where each first device impulse response describes the impulse response of the first impulse signal received at the respective receiver, determine a plurality of first source corrected device impulse responses by source correcting each of the plurality of first device impulse responses using the first source correction signal, generate the first device related transfer function of the device for the first microphone by combining the plurality of first source corrected device impulse responses.

5. The computer implemented method according to any one of the preceding items, wherein generating the device related transfer function comprises determine an energy content for at least one frequency of the first device related transfer function.

6. The computer implemented method according to any one of the preceding items, wherein generating the spatial room impulse response comprises, obtain a 3D room model representing the geometry of the room and at least one acoustic characteristic, arrange at least one digital representation of at least one room sound source in the 3D room model, arrange a digital representation of a room receiver array comprising a number of digital representations of receivers, wherein the room receiver array is centred on an at least one listening point in the 3D room model and where the number of digital representations of receivers are determined based on the energy content for the at least one frequency of the first device related transfer function, digitally emit a room impulse signal from the at least one audio sound source, determine a number of room impulse responses using at least a wave-based solver for at least one frequency, where each room impulse response describes the emitted room impulse as received at a corresponding one of the number of digital representations of receivers, generate a spatial room impulse response based on the number of room impulse responses.

7. The computer-implemented method according to any of the preceding items, wherein the predetermined distance is between 0.5-1.5 meters, preferably 0.8-1.2 meters or most preferred 1 meter.

8. The computer-implemented method according to any one of the preceding items, wherein the device comprises a plurality of microphones, such as a second, third, fourth, fifth microphone, wherein each of the plurality of microphones are treated as the first microphone such that a plurality of device related transfer functions, such as a second, third, fourth, fifth device related transfer function of the device is generated for each of the microphones.

9. The computer-implemented method according to any one of the preceding items, wherein determining the energy content for the at least one frequency of the first device related transfer function comprises determining different ambisonics orders corresponding to different levels of energy content.

10. The computer-implemented method according to any one of the preceding items, wherein the energy content is determined for a range of frequencies, such as from 0 to 20 kHz, such as 0 to 10 kHz, such as 10 to 20 kHz, such as 0 to 9 kHz, such as 0 to 8 kHz, such as 0 to 7 kHz, such as 0 to 6 kHz, such as 0 to 5 kHz, such as 0 to 4 kHz, such as 0 to 3 kHz, such as 0 to 2 kHz, such as 0 to 1 kHz.

11. The computer-implemented method according to any one of the preceding items, wherein generating an at least first device related transfer function (DRTF) comprises obtain a 3D box model comprising high acoustic absorption surfaces, or a 3D box model with a predefined size such that the first impulse signal received from the sound source to each of the plurality of digital representations of receivers do not comprise reflections caused by the surfaces of the 3D box model, arrange the device receiver array and the device mesh model in the 3D box model.

12. The computer-implemented method according to item 11, wherein the 3D box model is a 3D spherical model.

13. The computer-implemented method according to any one of the preceding items, wherein generating an at least first device related transfer function (DRTF) comprises arranging the device receiver array comprising the plurality of digital representations of receiver as a sphere or as an off-set shape where the digital representations of the receiver are placed/arranged at a predetermined off-set distance from the device mesh model.

14. The computer-implemented method according to any one of the preceding items, wherein the method further comprises determine a second number of room impulse responses using at least a geometrical acoustic solver for at least one geometrical acoustic frequency.

15. The computer-implemented method according to any one of the preceding items, wherein the number of impulse responses generated using the wave-based solver and the second number of room impulse responses generated using the geometrical acoustic solver are merged to generate a number of merged room impulse responses.

16. The computer-implemented method according to any one of the preceding items, wherein the number of room impulse responses generated using the wave-based solver are generated in low frequencies of an acoustic spectrum and the second number of impulse responses generated using the geometrical acoustic solver are generated in high frequencies of the acoustic spectrum.

17. The computer-implemented method according to item 16, wherein the acoustic spectrum is comprised between 0 and 20 kHz, such as between 0 and 15 kHz, such as between 0 and 12 kHz, such as between 0 and 10 kHz, such as between 0 and 8 kHz, such as between 0 and 6 kHz, such as between 20 and 20 kHz, such as between 20 and 15 kHz, such as between 20 and 12 kHz, such as between 20 and 10 KHz, such as between 20 and 8 kHz, such as between 20 and 6 KHz.

18. The computer-implemented method according to item 16, wherein the low frequencies of the acoustic spectrum are comprised between 0 and 20 kHz, such as between 0 and 15 kHz, such as between 0 and 12 kHz, such as between 0 and 10 KHz, such as between 0 and 8 kHz, such as between 0 and 6 kHz, such as between 20 and 20 KHz, such as between 20 and 15 kHz, such as between 20 and 12 kHz, such as between 20 and 10 kHz, such as between 20 and 8 kHz, such as between 20 and 6 kHz, such as between 20 and 5 kHz, such as between 20 and 4 kHz, such as between 20 and 3 kHz, such as between 20 and 2 kHz, such as between 20 and 1.5 kHz, such as between 20 and 1 KHz.

19. The computer-implemented method according to item 16, wherein the high frequencies of the acoustic spectrum are comprised between 1 kHz and 20 kHz, such as between 1.5 kHz and 20 kHz, such as between 2 kHz and 20 kHz, such as between 3 kHz and 20 KHz, such as between 4 KHz and 20 kHz, such as between 5 kHz and 20 KHz, such as between 6 KHz and 20 kHz, such as between 8 kHz and 20 kHz, such as between 10 KHz and 20 kHz, such as between 12 kHz and 20 kHz, such as between 1 KHz and 15 kHz, such as between 1.5 kHz and 15 kHz, such as between 2 KHz and 15 kHz, such as between 3 kHz and 15 kHz, such as between 4 kHz and 15 kHz, such as between 5 kHz and 15 kHz, such as between 6 kHz and 15 kHz, such as between 8 kHz and 15 kHz, such as between 10 KHz and 15 kHz, such as between 12 KHz and 15 kHz, such as between 1 kHz and 12 kHz, such as between 1.5 kHz and 12 kHz, such as between 2 kHz and 12 kHz, such as between 3 kHz and 12 kHz, such as between 4 kHz and 12 kHz, such as between 5 kHz and 12 kHz, such as between 6 KHz and 12 kHz, such as between 8 KHz and 12 kHz, such as between 10 KHz and 12 KHz.
20. The computer-implemented method according to any one of the preceding items, where the generated device specific room impulse response is encoded and decoded using ambisonics.
21. The computer-implemented method according to any one of the preceding items, where determining the energy content for at least one frequency of the first device related transfer function comprises determining the ambisonics order N for the energy content of the at least one frequency.
22. The computer-implemented method according to item 21, wherein the ambisonics order N is determined for multiple frequencies, where the energy content for each frequency is determined.
23. The computer-implemented method according to item 21 or 22, comprises determining the ambisonics order N for the energy content is based on determining the energy content as a sum of the ambisonics coefficients for each order N and then normalized to one for each frequency.
24. The computer-implemented method according to any one of the items 21-23, where the number of digital representations of receivers are determined based on the energy content for at least one frequency of the device related transfer function further comprises determining the number of digital representation of receivers based on the ambisonics order N, where the number of digital representations of receivers are (N+1)2, 1.5*(N+1)2 or 2*(N+1)2.
25. The computer implemented method according to any one of the preceding items, wherein generating the device related transfer function comprises
    obtain a device mesh model representing the geometry of the device and the position of the at least first microphone on the device mesh model,
    determine on the device mesh model a first closest mesh element, which is closest to the at least first microphone.
26. The computer implemented method according to any one of the preceding items, wherein generating the device related transfer function comprises
    arrange a digital representation of a device receiver array comprising a plurality of digital representations of receivers around the device mesh model, such that the distance between any of the digital representations of the receivers and the device mesh model is not below at predetermined distance.
27. The computer implemented method according to any one of the preceding items, wherein generating the device related transfer function comprises
    digitally emit a first impulse signal using the first closest mesh element as a sound source.
28. The computer implemented method according to any one of the preceding items, wherein generating the device related transfer function comprises
    arrange a digital representation of a first source correction microphone located at a first source distance from the first closest mesh element, wherein the first source distance is smaller than the predetermined distance,
    determine a first source correction signal using a wave-based solver, where the first source correction signal describes the first impulse signal as received at the first source correction microphone,
    determine a plurality of first source corrected device impulse responses by source correcting each of the plurality of first device impulse responses using the first source correction signal,
    generate the first device related transfer function of the device for the first microphone by combining the plurality of first source corrected device impulse responses.
29. The computer implemented method according to any one of the preceding items, wherein generating the device related transfer function comprises
    determine a plurality of first device impulse responses using a wave-based solver, and where each first device impulse response describes the impulse response of the first impulse signal received at the respective receiver.
30. The computer implemented method according to any one of the preceding items, wherein generating the spatial room impulse response comprises,
    obtain a 3D room model representing the geometry of the room and at least one acoustic characteristic.
31. The computer implemented method according to any one of the preceding items, wherein generating the spatial room impulse response comprises,
    arrange at least one digital representation of at least one room sound source in the 3D room model.
32. The computer implemented method according to any one of the preceding items, wherein generating the spatial room impulse response comprises,
    arrange a digital representation of a room receiver array comprising a number of digital representations of receivers, wherein the room receiver array is centred on an at least one listening point in the 3D room model and where the number of digital representations of receivers are determined based on the energy content for the at least one frequency of the first device related transfer function.
33. The computer implemented method according to any one of the preceding items, wherein generating the spatial room impulse response comprises,
    digitally emit a room impulse signal from the at least one audio sound source.
34. The computer implemented method according to any one of the preceding items, wherein generating the spatial room impulse response comprises,
    determine a number of room impulse responses using at least a wave-based solver for at least one wave-based frequency, where each room impulse response describes the emitted room impulse as received at a corresponding one of the number of digital representations of receivers.

35. The computer implemented method according to any one of the preceding items, wherein generating the spatial room impulse response comprises, generate a spatial room impulse response based on the number of room impulse responses.

The invention claimed is:

1. A computer-implemented method for generating an at least first acoustic transfer function describing one or more acoustic characteristics of a listening device as received by at least a first acoustic receiver, the method comprising:

obtaining a mesh model representing a geometry of the listening device and a position of the at least first acoustic receiver on the mesh model;

arranging a digital representation of a receiver array comprising a plurality of digital representations of receivers around the mesh model, such that a distance between any of the plurality of digital representations of receivers and the mesh model is not less than a predetermined distance;

determining a first closest mesh element on the mesh model, wherein the first closest mesh element is closest to the at least first acoustic receiver;

arranging a digital representation of a first source correction acoustic receiver located at a first source distance from the first closest mesh element, wherein the first source distance is less than the predetermined distance;

digitally emitting a first impulse signal using the first closest mesh element as a sound source;

determining a first source correction signal using a wave-based solver, wherein the first source correction signal describes the first impulse signal as received at the first source correction acoustic receiver;

determining a plurality of first impulse responses using a wave-based solver, wherein each first impulse response describes an impulse response of the first impulse signal received at a respective digital representation of a receiver;

determining a plurality of first source corrected impulse responses by source correcting each of the plurality of first impulse responses using the first source correction signal; and generating the at least first acoustic transfer function of the listening device for the first acoustic receiver by combining the plurality of first source corrected impulse responses.

2. The computer-implemented method according to claim 1, further comprising determining an energy content for at least one frequency of the first acoustic transfer function.

3. The computer-implemented method according to claim 2, wherein determining the energy content for the at least one frequency of the first acoustic transfer function comprises determining different ambisonics orders, thereby identifying different levels of energy content.

4. The computer-implemented method according to claim 2, wherein the energy content is determined for a range of frequencies, the range of frequencies comprising:

from 0 to 20 KHz;
from 0 to 10 KHz;
from 10 to 20 KHz;
from 0 to 9 kHz;
from 0 to 8 kHz;
from 0 to 7 kHz;
from 0 to 6 kHz;
from 0 to 5 kHz;
from 0 to 4 kHz;
from 0 to 3 kHz;
from 0 to 2 kHz; and
from 0 to 1 kHz.

5. The computer-implemented method according to claim 2, wherein determining the energy content for at least one frequency of the first acoustic transfer function comprises determining ambisonics order N for the energy content of the at least one frequency.

6. The computer-implemented method according to claim 5, wherein the ambisonics order N is determined for multiple frequencies, where the energy content for each frequency is determined.

7. The computer-implemented method according to claim 5, wherein determining the ambisonics order N for the energy content is based on determining the energy content as a sum of ambisonics coefficients for each order N and normalized to one for each frequency.

8. The computer-implemented method according to claim 5, wherein a number of digital representations of room receivers is determined based on the energy content for the at least one frequency of the acoustic transfer function, and wherein the method further comprises determining the number of digital representation of room receivers based on the ambisonics order N, wherein the number of digital representations of room receivers is one of:

$(N+1)^2$;

$1.5*(N+1)^2$; and $2*(N+1)^2$.

9. The computer-implemented method according to claim 1, wherein the predetermined distance is between 0.5-1.5 meters, and preferably between 0.8-1.2 meters, and most preferably 1 meter.

10. The computer-implemented method according to claim 1, wherein the listening device comprises a plurality of acoustic receivers including the first acoustic receiver and a second acoustic receiver, and wherein the second acoustic receiver is treated as the first acoustic receiver such that a second acoustic transfer function is generated for the second acoustic receiver.

11. The computer-implemented method according to claim 1, wherein generating the at least first acoustic transfer function comprises:

obtaining a 3D box model comprising high acoustic absorption surfaces, or a 3D box model with a predefined size such that the first impulse signal is received once by the receiver array; and arranging the receiver array and the mesh model in the 3D box model.

12. The computer-implemented method according to claim 1, wherein generating the at least first acoustic transfer function comprises arranging the receiver array comprising the plurality of digital representations of receivers as a sphere or as an off-set shape where the digital representations of the receivers are arranged at a predetermined off-set distance from the mesh model.

13. The computer-implemented method according to claim 1, further comprising generating a spatial room impulse response (SRIR), wherein the spatial room impulse response describes the acoustic characteristic of the room from at least one room sound source in the room and received at an at least one listening point in the room from at least one direction, wherein generating the spatial room impulse response comprises:

obtaining a 3D room model representing the geometry of the room and at least one acoustic characteristic;

arranging at least one digital representation of at least one room sound source in the 3D room model;

arranging a digital representation of a room receiver array comprising a number of digital representations of room receivers, wherein the room receiver array is centered on an at least one listening point in the 3D room model;

digitally emitting a room impulse signal from at least one audio sound source;

determining a number of room impulse responses using at least a wave-based solver for at least one wave-based frequency, wherein each room impulse response describes the emitted room impulse as received at a corresponding one of the number of digital representations of room receivers; and generating the spatial room impulse response based on the number of room impulse responses.

14. The computer-implemented method according to claim 13, wherein the number of digital representations of room receivers are determined based on an energy content for the at least one frequency of the first acoustic transfer function.

15. The computer-implemented method according to claim 13, further comprising determining a second number of room impulse responses using at least a geometrical acoustic solver for at least one geometrical acoustic frequency.

16. The computer-implemented method according to claim 15, wherein the number of impulse responses generated using the wave-based solver and the second number of room impulse responses generated using the geometrical acoustic solver are merged to generate a number of merged room impulse responses.

17. The computer-implemented method according to claim 15, wherein the number of room impulse responses generated using the wave-based solver are generated in low frequencies of an acoustic spectrum, and wherein the second number of impulse responses generated using the geometrical acoustic solver are generated in high frequencies of the acoustic spectrum.

18. A computer-implemented method for generating a listening device specific room impulse response describing an acoustic characteristic of a listening device and an acoustic receiver as received by the listening device, wherein the listening device comprises at least a first acoustic receiver, the method comprising:

generating an at least first acoustic transfer function, wherein the at least first acoustic transfer function describes the acoustic characteristic of the listening device as received by at least a first acoustic receiver, wherein generating the at least first acoustic transfer function comprises:

obtaining a mesh model representing a geometry of the listening device and a position of the at least first acoustic receiver on the mesh model;

arranging a digital representation of a receiver array comprising a plurality of digital representations of receivers around the mesh model, such that a distance between any of the plurality of digital representations of receivers and the mesh model is not less than a predetermined distance;

determining a first closest mesh element on the mesh model, wherein the first closest mesh element is closest to the at least first acoustic receiver;

arranging a digital representation of a first source correction acoustic receiver located at a first source distance from the first closest mesh element, wherein the first source distance is less than the predetermined distance;

digitally emitting a first impulse signal using the first closest mesh element as a sound source; and determining a first source correction signal using a wave-based solver, wherein the first source correction signal describes the first impulse signal as received at the first source correction acoustic receiver;

generating a spatial room impulse response (SRIR), wherein the spatial room impulse response describes the acoustic characteristic of the room from at least one room sound source in the room received at an at least one listening point in the room from at least one direction; and generating the listening device specific room impulse response by combining the acoustic transfer function and the spatial room impulse response.

19. The computer-implemented method according to claim 18, where the generated listening device specific room impulse response is encoded and decoded using ambisonics.

20. A computer system for generating an at least first acoustic transfer function describing one or more acoustic characteristics of a listening device as received by at least a first acoustic receiver, the computer system configured to:

obtain a mesh model representing a geometry of the listening device and a position of the at least first acoustic receiver on the mesh model;

arrange a digital representation of a receiver array comprising a plurality of digital representations of receivers around the mesh model, such that a distance between any of the plurality of digital representations of receivers and the mesh model is not less than a predetermined distance;

determine a first closest mesh element on the mesh model, wherein the first closest mesh element is closest to the at least first acoustic receiver;

arrange a digital representation of a first source correction acoustic receiver located at a first source distance from the first closest mesh element, wherein the first source distance is less than the predetermined distance;

digitally emit a first impulse signal using the first closest mesh element as a sound source;

determine a first source correction signal using a wave-based solver, wherein the first source correction signal describes the first impulse signal as received at the first source correction acoustic receiver;

determine a plurality of first impulse responses using a wave-based solver, wherein each first impulse response describes an impulse response of the first impulse signal received at a respective digital representation of a receiver;

determine a plurality of first source corrected impulse responses by source correcting each of the plurality of first impulse responses using the first source correction signal; and generate the at least first acoustic transfer function of the listening device for the first acoustic receiver by combining the plurality of first source corrected impulse responses.

* * * * *